United States Patent Office.

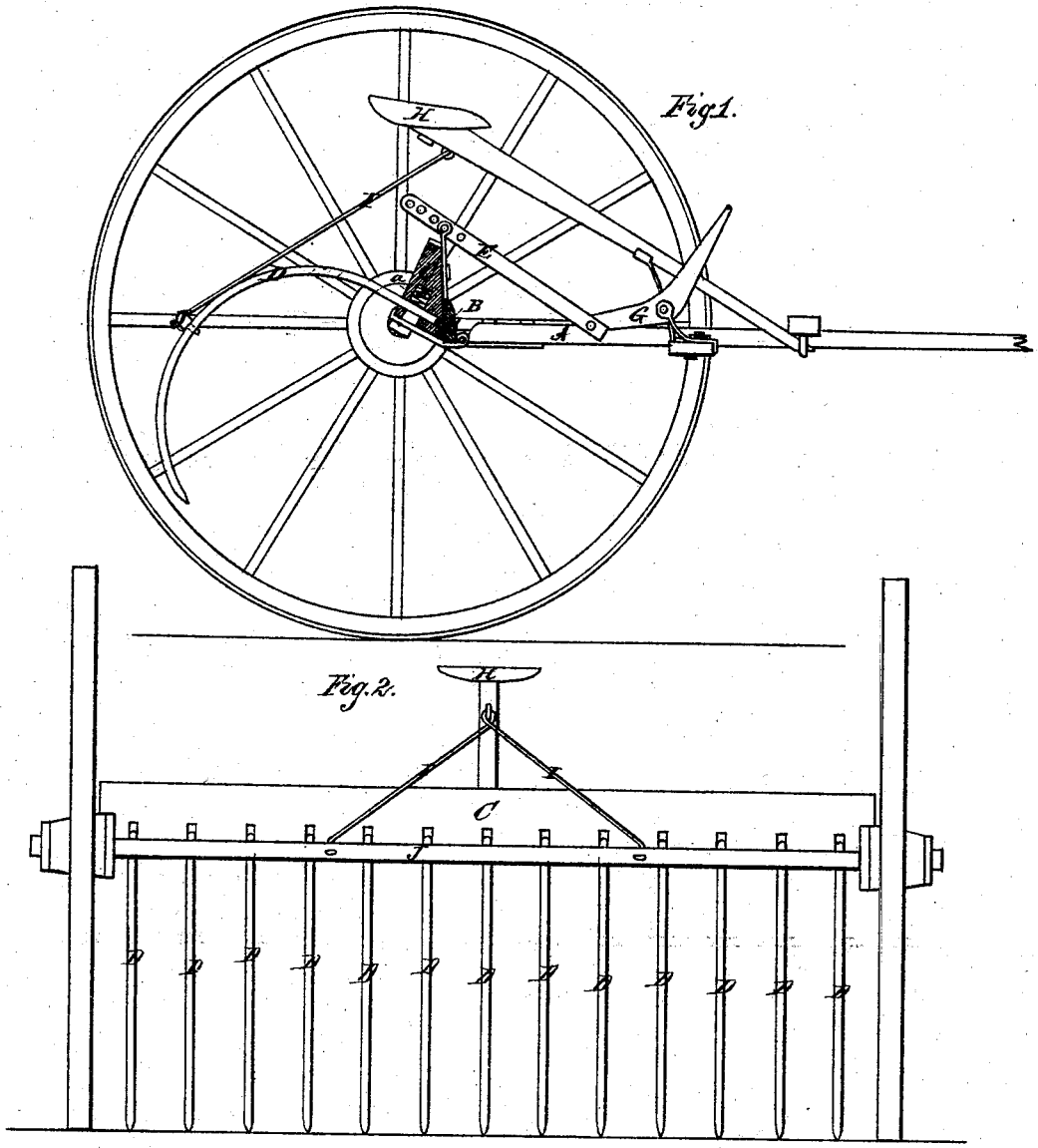

EMANUEL FORNEY AND JONAS SWAB, OF ELIZABETHVILLE, PENNSYLVANIA.

Letters Patent No. 98,946, dated January 18, 1870.

IMPROVEMENT IN HORSE HAY-FORKS.

The Schedule referred to in these Letters Patent and making part of the same.

To all whom it may concern:

Be it known that we, EMANUEL FORNEY and JONAS SWAB, of Elizabethville, in the county of Dauphin, and State of Pennsylvania, have invented certain new and useful Improvements in Horse Hay-Rakes; and we do hereby declare that the following is a full, clear, and exact description thereof, reference being had to the accompanying drawings, and to the letters of reference marked thereon, which form a part of this specification.

The nature of our invention consists in the construction and manner of operating a horse hay-rake, as will be hereinafter fully set forth.

In order to enable others skilled in the art to which our invention appertains, to make and use the same, we will now proceed to describe its construction and operation, referring to the annexed drawings, in which—

Figure 1 represents a longitudinal vertical section of our rake, and

Figure 2, a rear elevation of the same.

A A represent the shafts of our rake, which are hinged to a bar, B, secured firmly on the front side of a box, C, of suitable dimensions. This box either forms, itself, the axle of the rake, or has the axle attached to it in any suitable manner.

The rake-teeth D D are inserted in the box C from the rear side, near the bottom, and fastened in some suitable manner.

Above each tooth, (in said box,) and resting upon the same, is a wire spring, a, which gives the tooth more strength, and at the same time allows it to yield sufficiently to prevent breaking.

For the purpose of discharging the hay from the rake, there is a bar, E, pivoted at a convenient point on top of the box C, said bar being, at its other end, also pivoted to a bent lever, G, which, in its turn, is pivoted at its angle on the foot-board, connecting the two shafts A A, so as to be reached by the operator upon his seat H.

Under the seat H are pivoted two rods I I, which connect with a bar, J, extending on top of the teeth D D, and the width of the rake.

This bar J is, by one or more loops on its under side, connected with the rake-teeth, so that it will fall and rise with them, and also push the hay off from the teeth when they are raised, by tilting the box C, by means of the bent lever G.

Having thus fully described our invention,

What we claim as new, and desire to secure by Letters Patent, is—

The combination and arrangement of the shafts A A, box C, teeth D D, springs a a, bar E, lever G, seat H, rods I I, and bar J, all substantially as and for the purposes herein set forth.

In testimony that we claim the foregoing as our own, we affix our signatures in presence of two witnesses.

EMANUEL FORNEY.
JONAS SWAB.

Witnesses:
JOEL B. FERREE,
DANIEL A. GOOD.